United States Patent [19]

Puglia et al.

[11] 4,399,154

[45] Aug. 16, 1983

[54] COEXTRUDED CHEWING GUM

[75] Inventors: Wayne J. Puglia, Bellerose Villa; Sigismondo A. DeTora, Pearl River; Donald A. M. Mackay, Pleasantville, all of N.Y.

[73] Assignee: Nabisco Brands Inc., Parsippany, N.J.

[21] Appl. No.: 373,584

[22] Filed: Apr. 30, 1982

Related U.S. Application Data

[63] Continuation of Ser. No. 164,628, Jun. 30, 1980, abandoned.

[51] Int. Cl.³ ............................................. A23G 3/30
[52] U.S. Cl. ...................................... 426/5; 426/517; 426/518; 426/249
[58] Field of Search .................. 426/3, 4, 5, 6, 516, 426/517, 518, 249

[56] References Cited

U.S. PATENT DOCUMENTS

| | | | |
|---|---|---|---|
| 810,210 | 1/1906 | Laws | 426/5 |
| 1,193,423 | 8/1916 | Pryor | 426/5 |
| 1,786,606 | 12/1930 | Gordon | 426/5 |
| 1,810,453 | 6/1931 | Webster et al. | 426/5 |
| 2,973,273 | 2/1961 | Curtiss | 426/5 |
| 3,316,154 | 4/1967 | Sellers | 426/3 |
| 3,857,963 | 12/1974 | Graff et al. | 426/3 |
| 4,157,402 | 6/1979 | Ogawa et al. | 426/5 |

*Primary Examiner*—Jeanette M. Hunter
*Attorney, Agent, or Firm*—Richard Kornutik

[57] ABSTRACT

A coextruded chewing gum is provided which includes an extruded center portion surrounded by and bonded to an extruded outer shell portion. The center portion of the coextruded chewing gum may contain increased amounts of flavor, substantially greater than that ordinarily employed in chewing gums of conventional structure, and may have a different density than the outer shell portion to provide a textural difference upon chewing.

6 Claims, No Drawings

COEXTRUDED CHEWING GUM

This is a continuation of application Ser. No. 164,628, filed June 30, 1980 now abandoned.

FIELD OF THE INVENTION

The present invention relates to a coextruded chewing gum and more particularly to a coextruded chewing gum which includes a center portion having flavor levels substantially greater than heretofore thought possible in view of manufacturing and packaging problems normally encountered with the use of such flavor levels.

BACKGROUND OF THE INVENTION

The inclusion and maintenance of high flavor levels in chewing gum has long been a problem. Where it has been attempted to include flavors at a level in excess of 1.5%, it has been found that the increased flavor render the chewing gum excessively soft, sticky and difficult to handle in normal manufacturing processing.

U.S. Pat. No. 3,894,154 to Graff et al discloses a liquid center-filled chewing gum which includes a water-miscible humectant, such as glycerin, to maintain the fluidity of the liquid center. The use of the glycerin vehicle also allows for the inclusion of increased flavor levels within the liquid center, but does not inhibit migration of flavor into the chewing gum at the liquid/gum interface which occurs within a relatively short period of time after manufacture.

British Patent Application 2,016,895A discloses that the flavor migration problem discussed above may be resolved by including a mixture of sorbitol and proylene glycol in the liquid filling.

U.S. Pat. No. 1,198,423 to Pryor discloses a chewing gum which may be formed of a tube of chewing gum having a flavor stick core arranged within the central bore of the tube. Pryor indicates that the core may be a gum of concentrated flavor, that is, a casing of gum which itself may be flavored and a central flavor vehicle, such as a sugar preparation, which will carry a more concentrated flavor than can be imparted to a gum. The tube of chewing gum would be of neutral flavor so as to dilute the flavor of the core. In effect, Pryor teaches surrounding a sugar candy core with a gum casing, and then inserting the resulting combination in a tube of chewing gum. The chewing gum in either the casing or the tube would not include inordinate amounts of flavor due to the manufacturing and packing problems discussed above.

Accordingly, a need still exists for a solid center-filled chewing gum which center portion includes substantial amounts of flavor which will be retained in the center portion and not migrate to the outer shell portion of the gum and yet be capable of being manufactured and packaged using standard equipment.

DESCRIPTION OF THE INVENTION

In accordance with the present invention, a chewing gum is provided which may be manufactured and packaged using conventional equipment and yet may include high levels of flavor, even in excess of 2%, without unduly sticking to such equipment. The chewing gum of the invention is a coextruded chewing gum which is formed of an extruded center or core portion and an outer or shell portion coectruded with and about the core portion.

In a preferred embodiment of the invention, the cord portion will contain in excess of 1.5% flavor, and preferably from about 2.2 to about 4% by weight flavor, that is, flavor amounts not normally employed in all solid chewing gums. Although the core portion is, of itself, soft, sticky and difficult to handle, through coextrusion techniques, the outer shell layer acts as a support and protective coating for the soft and sticky inner core portion.

The increased amounts of flavor may be incorporated into the core portion by simply mixing the flavor with the chewing gum components (prior to extrusion) in accordance with conventional chewing gum manufacturing techniques. In another embodiment of the invention, liquid flavor may even be physically pumped into the core portion during coextrusion whereby the flavor will soak into the gum center but will not migrate into the outer or shell portion.

In another embodiment of the present invention, the coextruded chewing gum of the invention will comprise from about 5 to about 90% by weight and preferably from about 40 to about 75% by weight of the core portion, and from about 10 to about 95% by weight, and prefeably from about 25 to about 60% by weight of the outer shell portion. Thus, the core portion will be in a weight ratio to the shell portion of within the range of from about 0.05:1 to about 9:1, and preferably from about 0.67:1 to about 3:1 whereby the flavor of the core portion will remain therein without unduly migrating to the shell portion and subsequently into the atmosphere.

In a still further embodiment of the present invention, the structure and/or density of the core portion differs from that of the shell portion to provide a textural difference upon chewing. Thus, for example, a higher amount of air may be incorporated into the core portion during extrusion so that the core portion will have a spongy texture, while the outer shell layer will have a smoother, more continuous texture.

The present invention also includes a method for forming the coextruded chewing gum described above which method includes the steps of providing a chewing gum for the core portion which chewing gum contains at least about 2.5% by weight flavor based on the weight of said core portion, providing a chewing gum for the outer shell portion, extruding a rope of the chewing gum comprising the core portion, and simulataneously extruding a rope of the chewing gum comprising the outer shell portion about the extruded core portion to completely surround and form a protective barrier around and bonded to the core portion and thereby retard migration of flavor from the core portion to the outer shell portion and ultimately into the atmosphere.

As indicated, the flavor may be added to the gum base of the chewing gum forming the core portion at the site of chewing gum manufacture and even before extrusion thereof. Even though flavor usually has a plasticizing effect on gum base and the addition of more than 1.5% flavor will render a chewing gum too soft to adequately manipulate same into the desired product form, these problems are overcome by the method of the invention since the outer shell portion is bonded and is supportive of the less manageable core portion before handling or packaging of the core portion. However, if desired, the large amounts of flavor may be added to the chewing gum forming the core portion when such chewing gum is in a final condition or more manageable physical state. In this case, the flavor is injected into the chewing gum at one or several sites during the extrusion thereof. The flavor is preferably injected into the chewing gum at several sites of addition rather than one larger center to enable flavor to more easily migrate into the body of the chewing gum. Smaller sites of liquid flavor addition will also minimize the occurrence of "voids" or pockets throughout the center which may interfere with organoleptic qualities.

Except for the extraordinarily high flavor concentration of the core portion, each of the chewing gums forming the core portion and outer shell portion may comprise chewing gum formulations generally known in the art. Each of these chewing gums may be of the same of different type and thus may be of sugar-containing or sugarless variety. Thus, in the sugar-containing coextruded chewing gum of the invention, both the core and outer shell portions may be sugar-containing or one may be sugar-containing and the other sugarless. For example, a coextruded chewing gum of the invention having an initial sweet taste and while still providing prolonged sweetness, may include a sugar-containing outer shell portion as disclosed in U.S. applications Ser. Nos. 96,961 and 102,069 and in U.S. application Ser. No. 953,291, now U.S. Pat. Nos. 4,271,199, 4,271,198 and 4,217,368, which provides for initial sweetness impact, and a surgarless or a sugar containing core portion as disclosed in U.S. Pat. Nos. 4,064,274 and 4,085,227 which provides for a delayed but prolonged sweetness.

A preferred sugar-containing chewing gum for both the core portion and outer shell portion is disclosed in U.S. application Ser. No. 953,291 now U.S. Pat. No. 4,217,368 and in U.S. applications Ser. No. 96,961 and 102,069.

A preferred sugarless chewing gum for both the core and outer shell portions is disclosed in U.S. Pat. Nos. 4,064,274 and 4,085,227 and in U.S. application Ser. No. 953,291, now U.S. Pat. No. 4,217,368.

Flavors which may be added in forming the core portion and/or the outer shell portion of the coextruded product of the invention comprise flavor oils, including acids such as adipic, succinic and fumaric acid, citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the center fill.

In the case of the core portion, as indicated above, the flavor will be present in an amount of in excess of about 1.5% by weight of the core portion. However, the outer shell portion will contain from about 0.3 to about 1.2% by weight flavoring.

As indicated, either or both of the core portion and the outer shell portion may include a natural sugar and/or non-sugar or artificial sweetener.

The term "natural sugar" includes one or more sugars and sugar containing material, or sugar alcohols, for example, monosaccharides of 5 to 6 carbon atoms, such as arabinose, xylose, ribose, glucose, mannose, galactose, fructose, dextrose, or sorbose or mixtures of two or more of the foregoing monosaccharides; disaccharides, for example, sucrose such as cane or beet sugar, lactose, maltose or cellobiose, polysaccharides, such as partially hydrolyzed starch, dextrin or corn syrup solids, or sugar alcohol, such as sorbitol, xylitol, mannitol or arabitol, or hydrogenated starches or hydrogenated starch hydrolysates.

The hydrogenated starches also referred to as hydrogenated starch hydrolysates employed herein may include those disclosed in U.S. Patent No. Re. 26,959 or U.S. Pat. No. 3,556,811 as well as various hydrogenated glucose syrups and/or powders which contain sorbitol, hydrogenated disaccharides, tri- to hexa-hydrogenated saccharides, and hydrogenated higher polysaccharides, or mixtures of any two or more of the above.

The hydrogenated glucose syrups and/or powders may by produced by catalytic hydrogenation of standard glucose syrups (acid and/or enzyme converted) to the point where all the glucose end groups of the saccharides are reduced to alcohols, that is, dextrose to sorbitol. In the case of hydrogenated glucose syrups, the total solids are made of from about 4 to about 20% sorbitol, from about 20 to about 65% hydrogenated disaccharides (that is, maltitol), from about 15 to about 45% tri- to hepta-hydrogenated saccharides, and from about 10 to about 35% hydrogenated saccharides higher than hepta.

Where the core portion and/or outer shell portion contain a natural sugar, such as sucrose or a sugar alcohol or hydrogenated starch hydrolysate, such sweetener will be present in an amount of from about 0.05 to about 90% and preferably from about 65 to about 83% by weight of such portion.

In addition, as mentioned hereinbefore, the core and-/or outer shell portions may include articicial sweeteners, such as sodium, calcium or ammonium saccharin salts, dighydrochalcones, glycyrrhizin, diptoassium glycyrrhizin, glycyrrhizic acid ammonium salt, L-aspartyl-L-phenylalanine methyl ester, as well as *Stevia rebaudiana* (Stevioside), *Richardella dulcifica* (Miracle Berry), *Dioscoreophyllum cumminsii* (Serendipidity Berry), cyclamate salts, and the like, or mixtures of any two or more of the above. The above sweeteners where present may be employed in an amount of from about 0.02 to about 2% and preferably from about 0.05 to about 1% by weight of each of said portions.

The chewing gum employed for the core portion or the other shell portion will include a relatively water-insoluble, water-impenetrable gum base in an amount ranging from about 8 to about 50%, and preferably from about 15 to about 40% by weight of the chewing gum composition.

In general, the gum base is prepared by heating and blending various ingredients, such as, natural gum, synthetic resins, waxes, plasticizers, etc., in a manner well known in the art. Typical examples of the ingredients found in a chewing gum base are masticatory substances of vegetable origin, such as chicle, crown gum, nispero, rosidinha, jelutong, pendare, perillo, niger gutta, tunu, etc., masticatory substances of synthetic origin, such as butadiene-styrene polymer, isobutyleneisoprene copolymer, petroleum wax, polyethylene, polyisobutylene, polyvinylacetate, etc., plasticizers, such as lanolin, stearic acid, sodium stearate, potassium stearate, etc., antioxidants, such as butylated hydroxyanisole, butylated hydroxytoluene, and propyl gallate.

The water-insoluble gum base may consist of any of the various bases disclosed for example in U.S. Pat. Nos. 3,052,552 and 2,197,719.

The chewing gum for each of the portions of the coextruded gum may also contain conventional ester gums, polydextrose, fillers, such as calcium carbonate, and texturizers, such as hydrated alumina, plasticizers, softeners or emulsifiers, such as lecithin, fatty acids, glycerine, glyceryl monostearate, hydrogenated vegetable oils, sorbitan monostearate, tallow, propylene glycol, F.D.&C. coloring agents, and other conventional chewing gum additives as will be apparent to those skilled in the art.

The chewing gum itself may be prepared employing conventional chewing gum manufacturing techniques.

A preferred chewing gum composition which may be employed in extruding the outer shell portion and even the core portion, if desired, is set out below.

| Ingredient | Parts by Weight |
|---|---|
| Gum base | 13 to 32 |
| Softener (e.g. lecithin) | 0.1 to 1 |
| Corn syrup solids (D.E. 20-42) | 4 to 15 |
| Sugar (or other bulking agent) | 40 to 75 |
| Liquid flavor | 0.5 to 3 |
| Other plasticizer | 0.2 to 2 |
| Liquid sorbitol (65 to 75% solids) | 5 to 18 |
| Color | 0 to 0.5 |

The above chewing gum may be prepared as follows. The gum base is first melted; thereafter the melted gum base is cooled to below about 200° F., and preferably below about 180° F., and softener, such as lecithin, is thoroughly mixed for about 1 to 3 minutes in the gum base which at this time is in the form of a continuous mass. Thereafter, from about 10 to about 40% by weight of the total amount of sweetener-bulking agent, which preferably is fine granular sugar, is mixed for about 2 to about 10 minutes with the continuous mass of gum base and softener during which time the continuous mass breaks up into granules or chunks. The corn syrup solids are then mixed with the granules for about 4 to about 6 minutes and then the remaining sweetener-bulking agent and flavors are mixed with the above mixture for about 1 to about 3 minutes to form a fine granular aerated discontinuous mass. Finally, the liquid sorbitol is added to the discontinuous mass and mixed therewith for about 3 to about 6 minutes to form a cohesive, but still discontinuous mass. Thereafter, if desired, solid flavor may be added and mixed with the gum base mix to form a chewing gum which is ready for extrusion.

Another chewing gum which is especially adapted for use in the outer shell portion of the coextruded chewing gum of the invention will have the following composition:

| Ingredient | Parts by Weight |
|---|---|
| Gum base | 12 to 35 |
| Preformed sweetener combination | |
| A. Solid sweetener | 20 to 85 |
| Powdered sugar | |
| B. Liquids | |
| High fructose syrup (40-90% solids) | 0 to 50 |
| Liquid glucose | 0 to 50 |
| Invert sugar | 0 to 50 |
| Flavor | 0.2 to 1.5 |
| Lecithin | 0 to 1 |
| Corn syrup solids | 0 to 15 |
| Glycerin | 0 to 2 |

The above chewing gum may be prepared by the following procedure.

The preformed recrystallized sweetener combination is first prepared by heating a mixture of the solid sweetener (e.g., powdered sugars or liquid sugars in water) and the liquid sweetener (e.g., high fructose syrup, liquid glucose, corn syrup, invert sugar, or a mixture of two or more of the above) at a temperature within the range of from about 200° to about 260° F., and preferably from about 230° to about 250° F., with or without stirring, to form a homogeneous mass, and then cooling the homogeneous mass, for example, by exposing to ambient air or a cooled surface. One or more conventional techniques are employed, such as seeding or stirring to cause the sweeteners to recrystallize and form an amorphous mass.

Reconstituted "dry fondant" mix may also be employed as the performed sweetener combination.

The chewing gum is prepared by mixing melted gum base (heated at, for example, 160-175° F.) and color, adding about one-third of the preformed sweetener combination and mixing for 1 to 3 minutes, adding a second one-third portion of preformed sweetener combination to the mixture and mixing for 1-2 minutes, adding softener and moisture retaining substance, such as corn syrup solids, and mixing for 1-2 minutes, adding softener, such as lecithin, and flavor, and mixing for 1-2 minutes, and then adding the remaining portion of preformed sweetener combination with stirring, and then optionally adding spray-dried flavor and mixing the entire mass for 2 to 5 minutes.

If desired, the above may be mixed with one or more easily extractable water-soluble sweeteners, such as natural sugar, soluble saccharin salts, aspartame, Acesulfame-K, water-soluble food acid and/or flavors. The resulting mix is then ready for extrusion.

Preferred chewing gum formulations which are especially designed for both long-lasting prolonged sweetness and flavor release and also for initial burst of sweetness are set out below. These compositions may be employed in the core portion and/or outer shell portion.

| | Sugar-Containing | |
|---|---|---|
| | | Range % By Weight of Chewing Gum |
| A. | Water-soluble phase | |
| | Sorbitol syrup (% solids 68 to 72) | 3-12 |
| | Sugar | 28-32 |
| B. | Water-insoluble phase | |
| | Gum base | |
| | Bubble gum | 12-25 |
| | Regular | 12-25 |
| | Sugar | 28-32 |
| | Flavor | 0.2-3 |

| | Sugarless | |
|---|---|---|
| | | Range % By Weight of Chewing Gum |
| A. | Water-soluble phase | |
| | Sorbitol | 25-35 |
| | Sorbitol syrup (% solids 68 to 72) | 18-30 |
| B. | Water-insoluble phase | |
| | Gum base | |
| | Bubble gum | 12-25 |
| | Regular | 12-25 |
| | Mannitol or sorbitol | 20-30 |

| -continued | |
|---|---|
| Flavor | 0.2-3 |

These chewing gums are disclosed in U.S. application Ser. No. 953,291, now U.S. Pat. No. 4,217,368.

The above chewing gums may be prepared as described below. The gum base is first melted, emulsifier such as lecithin and second sweetener are thoroughly mixed, for at least two minutes, in the melted gum base (which is maintained at a temperature preferably not exceeding 200° F.) to effect uniform distribution and seal the second sweetener in the gum base. Flavors, food acids (where desired) are added and the mixture is mixed for from 1 to 2 minutes. The mix, at this time, is a continuous cohesive mass. At this stage auxiliary or first sweetener, preferably in particulate form, which may be another portion of the same sweetener as the second sweetener, or other sweetener, is added to the continuous mass with mixing being continued for from 1 to 5 minutes, thereby causing the continuous mass to be torn apart into discrete, separate masses of gum base containing second sweetener sealed therein said discrete masses being suspended in particles of first sweetener to form a heterogeneous mass. The aqueous plasticizer or softener is added to and mixed with the heterogeneous mass for from 1 to 5 minutes, and preferably from 1 to 3 minutes. Thereafter, the solid flavor, for example, encapsulated or fixed on dextrin or gum arabic, and water-soluble acids may be added and mixed with the gum mass to form a smooth chewing gum which is ready for extrusion.

When the aqueous plasticizer or softener is added after the mix is in discontinuous discrete masses or clumps containing second sweetener sealed therein and suspended in the auxiliary or first sweetener, substantially all water from the aqueous plasticizer, such as sorbitol syrup, will be taken up by the water-soluble particulate auxiliary or first sweetener, and the water will not be available for solubilizing the second sweetener sealed in the gum base. The second sweetener initially added to the melted gum base to form a continuous mass will be substantially buried in the gum base and protected from any solubilization (for example, due to aqueous polyol syrup) even after the gum base mix is torn into discrete masses or clumps.

As indicated hereinbefore, particularly suitable for core portions are the chewing gums disclosed in U.S. Pat. Nos. 4,064,274 and 4,085,227, the disclosures of which are incorporated herein by reference.

It will be appreciated that substantially any conventional type chewing gum may be employed in forming the coextruded product of the invention.

In forming the coextruded final product, regardless of the type of chewing gum to be employed, the chewing gum for each of the outer shell and core portions are fed through coextrusion apparatus such as is available from Turbo-Bepex (Hutt) Company or other conventional equipment, to form a core portion bonded to an outer shell portion, the core portion containing at least about 1.5% by weight flavor as described hereinbefore.

The coextruded chewing gum product of the invention may take various shapes, and sizes, may be multi-colored and/or multi-flavored, that is, the core portion may be of a color and/or flavor different from the color and/or flavor of the outer shell portion. In addition, as indicated, different types of chewing gums may be employed in each of the core portion and outer shell portion to provide both initial burst of sweetness and flavor and thereafter prolonged sweetness and flavor.

The following Examples illustrate preferred embodiments of the present invention without, however, limited the same thereto. All temperatures are expressed in °F.

EXAMPLE 1

A coextruded cherry flavor chewing gum in accordance with the present invention is prepared as follows.

A long lasting cherry flavor chewing gum is prepared as described in Example 1 of U.S. Pat. No. 4,085,227 from the following ingredients:

| Ingredients | Core Portion Parts by Weight |
|---|---|
| Gum base | 20 |
| Sugar | 50 |
| Corn syrup | 16 |
| Dextrose | 10 |
| Lecithin | 0.2 |
| Citric acid | 0.5 |
| Fumaric acid (passes through a U.S. 140 mesh screen) | 2 |
| Free saccharin acid (passes through a U.S. 140 mesh screen) | 0.2 |
| Artificial cherry flavor | 2.5 |
| Gum arabic coated cherry flavor | 0.6 |

The gum base is melted (temperature 270°) and placed in a standard dough mixer kettle equipped with sigma blades. The corn syrup and lecithin are added and mixed for 2 minutes at 200°. At the time the mix is folding well, powdered free saccharin and powdered fumaric acid are added to the base-syrup mix and the mixture is mixed for 1 minute at 200°. Thereafter, the sucrose, dextrose, flavor oil, citric acid, and coloring agents are added and blended with the above mixture for 5 minutes at 160°. The resulting gum is discharged from the kettle and is ready for extrusion.

Outer Shell Portion

The above formulation (with the exception that only 1% cherry flavor is present) is used for the outer shell portion.

Each of the above formulations is fed to a double rotary bar roll press model DDP Turbo International (Hutt-BEPEX) wherein a coextruded product is formed which contains a core portion having 3.1% flavor surrounded by and bonded to an outer shell portion.

The so-formed coextruded product is formed into blocks which are found to have an initial sweet and flavorful taste provided by the outer shell portion and thereafter a much prolonged level of flavor and sweetness provided by the core portion.

EXAMPLE 2

A coextruded peppermint flavored chewing gum in accordance with the present invention is prepared as follows.

Core Portion

A. A chalk-free gum base having the composition as set out below is prepared employing conventional gum base making techniques.

| Ingredients | Parts By Weight of Gum Base |
|---|---|
| Polyvinyl acetate | 30 |
| Paraffin wax | 18 |
| Ester gum types | 22 |
| Natural waxes | 5 |
| Butylated hydroxy toluene | 1000 ppm/parts of base |
| Elastomer | 10 |
| Glyceryl monostearate | 6 |
| Hydrogenated vegetable fat | 7 |

B. A long-lasting peppermint flavor chewing gum is prepared as described in Example 1 of U.S. Pat. No. 4,064,274 from the following ingredients:

| Ingredients | Parts by Weight of Chewing Gum |
|---|---|
| Chalk free gum base (as disclosed in Example 2A) | 22 |
| Corn syrup, 44° Be' | 17 |
| Powdered free saccharin acid (pulverized to pass through a U.S. 140 mesh screen) | 0.2 |
| Powdered sugar (sucrose) | 47.6 |
| Sorbitol | 10 |
| Peppermint oil | 2 |
| Peppermint (spray dried) | 1 |
| Lecithin | 0.2 |

The gum base is melted (temperature 270°), colled to 180° and placed in a standard dough mixer kettle equipped with sigma blades. The corn syrup and lecithin are added and mixed for 2 minutes at 200°. Flavor oil is then added and incorporated into the base. At the time the mix is folding well, powdered free saccharin is added and the mixture is mixed another 2 minutes at 200°. Thereafter, about one half of the sucrose is added and the mixture is mixed for 2 minutes. The sorbitol and remaining sucrose are added, mixed for 1 minute and then spray dried flavor is added and the mixture is mixed for 1 minute. The gum is then discharged from the kettle, cut into 25 lb. loaves and allowed to cool to 90°–120° F. It is then rolled to a thickness of 0.178 cm on a standard Gimpel machine and scored into strips 7.26 cm wide and 41.9 cm long, and cooled for 12–18 hours.

Outer Shell Portion

The above formulation, except for the flavor level which is 0.8 parts by weight peppermint oil, is employed for the outer shell portion.

Each of the above formulations is fed into coextrusion apparatus as described in Example 1 to form a coextruded chewing gum which contains a core portion having 2.5% flavor surrounded by and bonded to an outer shell portion.

The so-formed coextruded product is formed into blocks which have an initial and prolonged sweet and flavorful taste.

EXAMPLE 3

An orange flavor coextruded chewing gum in accordance with the present invention is prepared as follows.

Core Portion

An orange-flavored chewing gum of the following composition is prepared as described below.

| Ingredients | Parts by Weight |
|---|---|
| Gum base | 20 |
| Sugar (dispersed in melted gum base) | 26 |
| (mixed with cooled gum base) | 26 |
| Sorbitol (liquid) | 10 |
| Liquid orange flavor | 1.5 |
| Spray dried orange flavor | 1.1 |
| Maltrin M100 (corn syrup solids thickener-DE 9-12, Grain Processing Corp., Iowa) | 10.5 |
| Citric acid | 0.9 |
| Fumaric acid | 4 |

The gum base is added to a steam jacketed kettle equipped with a sigma blade mixer. The base is melted and adjusted to a temperature of about 180° F. to 200° F.

About one-half of the sugar is thoroughly mixed into the melted gum base (while the gum base is folding well) for about 3 minutes to disperse the sugar throughout the continuous mass of gum base. The sugar is thereby trapped in or otherwise protected by the gum base.

Thereafter, the fumaric acid is added with mixing for about 30 seconds, and the liquid flavor is added with mixing for about 1 minute. The remaining sugar is added with mixing for about 2 minutes thereby causing the mass to be torn apart into discrete pieces. The Maltrin M100 and liquid sorbitol are added to the discrete pieces of gum base with mixing for about 2 minutes, and the citric acid and spray dried flavor are added with mixing for about 2 minutes. The mass, now smooth and continuous, is removed from the kettle and is ready for extrusion.

Outer Shell Portion

The above formulation (with the exception that only 0.6% of orange flavor is present) is used for the outer shell portions.

Each of the above formulations is fed to a coextrusion apparatus as described in Example 1 to form a coextruded chewing gum which contains a core portion having 2.6% flavor surrounded by and bonded to an outer shell portion.

The so-formed coextruded product is formed into blocks which are initially sweet and flavorful and have a prolonged sweet flavorful taste as well.

EXAMPLE 4

A coextruded chewing gum having the following composition is prepared in accordance with the method of the invention as described below.

Core Portion

A core portion as described in Example 3 is employed.

Outer Shell Portion

An outer shell portion having the following ingredients is prepared as described below.

| Ingredient | Parts by Weight |
|---|---|
| Gum base | 19 |
| lecithin | 1.5 |
| Sugar, pulverized | 54.5 |

-continued

| Ingredient | Parts by Weight |
| --- | --- |
| Corn syrup solids (D.E. 24) | 7.5 |
| Liquid sorbitol (70% solids) | 15 |
| Liquid flavor (fruit blend) | 1 |
| Flavor oil | 1.0 |
| Spray dried flavor | 0.5 |
| Color | 0.05 |

The gum base is melted (160°–175° F.) and placed in a standard dough mixer equipped with sigma blades. Lecithin is added and mixed for 1 minute. About ⅓ of the sugar is added and mixed for 1 minute during which time the gum base breaks up into granules. The corn syrup solids are added to the granules and mixed therewith for 2 minutes during which time the gum base granules are further broken up into more granules. The remainder of the sugar and the liquid flavor are then mixed with the aforedescribed granules for about 2 minutes to form a fine granular aerated discontinuous mass. Thereafter, the liquid sorbitol is mixed with the discontinuous mass for about 3 minutes to form a cohesive mass. Thereafter, the spray dried flavor is mixed into the mass to form a chewing gum which is ready for extrusion.

Each of the above chewing gum formulations are formed into a coextruded product as described in Example 1, which product has an initial flavor and sweetness impact provided by the outer shell and a prolonged sweet and flavorful taste provided by the core.

EXAMPLE 5

A coextruded chewing gum is prepared as described below.

Core Portion

A core portion as described in Example 3 is employed.

Outer Shell Portion

An outer shell having the following ingredients is prepared as described below.

| | Parts by Weight |
| --- | --- |
| Gum base | 16.8 |
| Preformed sweetener combination | |
| A. Solids | |
| Sucrose | 45 |
| B. Liquid | |
| High fructose syrup (70% solids) | 25 |
| Liquid glucose (80% solids) | 20 |
| Invert sugar (70% solids) | 25 |
| Flavor | 3 |
| Color | 0.2 |
| Corn syrup solids | 8 |
| Lecithin | 0.4 |

The solids (A) and liquids (B) are mixed together and heated to 240° F. with constant agitation to form a homogeneous mass. The homogeneous mass is allowed to cooled by exposure to ambient air for 20 minutes to cause the sweetener solids to recrystallize and form an amorphous mass.

The gum base is melted (160°–175° F.) and placed in a pre-heated standard dough mixer equipped with sigma blades. Color is added and mixed for 3–4 minutes. About one-third of the preformed amorphous sweetener mass is added and mixed for 1–3 minutes. Thereafter, another one-third portion of preformed amorphous sweetener mass is added and mixed for 2–3 minutes. The corn syrup solids are added and mixed for 1–2 minutes followed immediately with lecithin and flavor and mixed for about 2–3 minutes. The remaining preformed amorphous sweetener mass is added and the mixture mixed for 2–5 minutes.

The chewing gum prepared above is ready for extrusion.

Each of the above chewing gums are formed into a coextruded product following the procedure of Example 1, which product has an initial flavor and sweetness impact provided by the outer shell and a prolonged sweet and flavorful taste provided by the core.

What is claimed is:

1. A coextruded chewing gum having improved flavor comprising from about 40 to about 75% by weight of an extruded soft gum core portion and from about 25 to about 60% of an outer shell portion formed of chewing gum and extruded simultaneously with said core portion, said core portion formed of chewing gum containing from about 1.5% to about 2% by weight flavor based on the total weight of the coextruded chewing gum, and from about 2.2 to about 4% by weight flavor based on the weight of the core portion, said outer shell portion having a density different than the density of the chewing gum of said core portion, and containing from about 0.3 to about 1.2% by weight flavoring based on the weight of the shell portion, said shell portion being bonded by means of said coextrusion to said core portion to provide a support and protective barrier therefor to retain said flavor in said core portion and retard migration of flavor from said core portion to the outer surface of said shell portion.

2. The coextruded chewing gum as defined in claim 1 wherein said core portion is present in a weight ratio to said outer shell portion of from about 0.05:1 to about 9:1.

3. The coextruded chewing gum as defined in claim 2 wherein said ratio is from about 0.67:1 to about 3:1.

4. The coextruded chewing gum as defined in claim 1 wherein the chewing gum forming said core portion is comprised of synthetic gum base and is free of antioxidants, said outer shell portion protecting said core portion from thermal and other types of oxidative degradation.

5. The coextruded chewing gum as defined in claim 1 wherein one of said core portion and said outer shell portion is formed of chewing gum which provides fast flavor and sweetness release, while the other of said portions is formed of chewing gum which provides slow initial but prolonged sweetness or flavor release.

6. A method forming a coextruded chewing gum as defined in claim 1, which comprises providing a chewing gum for said core portion containing from about 2.2% to about 4% by weight flavor based on the weight of said core portion, and a chewing gum for said outer shell portion having a density different than the density of the chewing gum of said core portion and containing from about 0.3 to about 1.2% by weight flavoring based on the weight of said shell portion, extruding a rope of said chewing gum comprising said core portion, and simultaneously extruding a hollow rope of said chewing gum comprising said outer shell portion about said extruded core portion to completely surround and form a protective barrier around and bonded to said core portion and thereby retard migration of moisture from said core portion to said outer shell portion.

* * * * *